(12) United States Patent
Weng et al.

(10) Patent No.: US 12,153,441 B2
(45) Date of Patent: Nov. 26, 2024

(54) METHOD FOR COOPERATIVE MANEUVER PLANNING FOR AT LEAST TWO VEHICLES AND ASSISTANCE SYSTEM

(71) Applicant: Volkswagen Aktiengesellschaft, Wolfsburg (DE)

(72) Inventors: Michael Weng, Berlin (DE); Reza Balaghiasefi, Wolfsburg (DE); Stefan Gläser, Braunschweig (DE); Monique Engel, Knesebeck (DE); Sebastian Leutner, Braunschweig (DE); Matthias Schid, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 219 days.

(21) Appl. No.: 18/064,385

(22) Filed: Dec. 12, 2022

(65) Prior Publication Data
US 2023/0185311 A1    Jun. 15, 2023

(30) Foreign Application Priority Data
Dec. 14, 2021  (DE) ...................... 10 2021 214 341.5

(51) Int. Cl.
G05D 1/00    (2024.01)
(52) U.S. Cl.
CPC ......... G05D 1/0289 (2013.01); G05D 1/0214 (2013.01); G05D 1/0217 (2013.01)
(58) Field of Classification Search
CPC ... G05D 1/0289; G05D 1/0214; G05D 1/0217
See application file for complete search history.

(56) References Cited

U.S. PATENT DOCUMENTS 10,386,855 B2   8/2019 Lehmann et al.
10,564,647 B2   2/2020 Balaghiasefi et al.
(Continued)

FOREIGN PATENT DOCUMENTS

DE    102014211507 A1   12/2015   ............ B60W 30/00
DE    102015217891 A1    3/2017   ............ B60W 30/08
(Continued)

OTHER PUBLICATIONS

German Office Action, Application No. 102021214341.5, 6 pages, Jul. 29, 2022.

*Primary Examiner* — Seth A Silverman
(74) *Attorney, Agent, or Firm* — Slayden Grubert Beard PLLC

(57) ABSTRACT

An assistance system/method for cooperative maneuver planning is taught, wherein in each vehicle, a planned trajectory and a desired trajectory are selected depending on a cost function; wherein a most economical first trajectory is generated which is free of collisions with planned and desired trajectories of other vehicles, and i) wherein a most economical second trajectory is generated which ignores planned and desired trajectories of other vehicles and is transmitted as a desired trajectory only if a cost difference between the first and the second trajectory is greater than a minimum cost reduction value, wherein additionally/alternatively to i), a most economical third trajectory is generated which is free of collisions with planned trajectories of other vehicles but ignores their desired trajectories, wherein a desired trajectory of another vehicle is accepted if a cost difference between the first and the third trajectory is less than a maximum cost increase value.

20 Claims, 4 Drawing Sheets

(56) References Cited

U.S. PATENT DOCUMENTS

| | | | |
|---|---|---|---|
| 11,377,118 B2 | 7/2022 | Fuchs et al. | |
| 2014/0032035 A1* | 1/2014 | Thomson | G05D 1/0274 |
| | | | 701/25 |
| 2014/0195093 A1 | 7/2014 | Litkouhi et al. | 701/23 |
| 2020/0050214 A1* | 2/2020 | Goehl | G06V 20/584 |
| 2020/0363806 A1* | 11/2020 | Kobilarov | G06V 20/56 |
| 2022/0057803 A1* | 2/2022 | Sorin | G05D 1/0214 |

FOREIGN PATENT DOCUMENTS

| | | | | |
|---|---|---|---|---|
| DE | 102015221817 A1 | 5/2017 | | B60W 30/08 |
| DE | 102017206987 A1 | 10/2018 | | B60W 30/08 |
| DE | 102018109885 A1 | 12/2018 | | B60W 30/08 |
| DE | 102019208291 A1 | 12/2020 | | B60W 30/08 |

* cited by examiner

METHOD FOR COOPERATIVE MANEUVER PLANNING FOR AT LEAST TWO VEHICLES AND ASSISTANCE SYSTEM

CROSS-REFERENCE TO RELATED APPLICATIONS

This application claims priority to German Patent Application No. DE 10 2021 214 341.5, filed on Dec. 14, 2021 with the German Patent and Trademark Office. The contents of the aforesaid patent application are incorporated herein for all purposes.

TECHNICAL FIELD

The invention relates to a method and an assistance system for cooperative maneuver planning for at least two vehicles.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

With cost-based trajectory planners, normally a number of drivable trajectories is generated in the context of a planning cycle depending on the environment (also termed a "trajectory space"). Then the generated trajectories are evaluated using a cost function. The cost-optimized, collision-free trajectory is selected for planning and used as a planned trajectory. Such a planning cycle is run through repeatedly within a short time interval in order to continuously react to changes to a traffic situation in the environment.

SUMMARY

A need exists to improve a method for cooperative maneuver planning for at least two vehicles and a corresponding assistance system.

The need is addressed by a method and an assistance system having the features of the independent claims. Embodiments of the invention are apparent from the dependent claims, the following description, and the drawings.

DESCRIPTION

Figure 1:
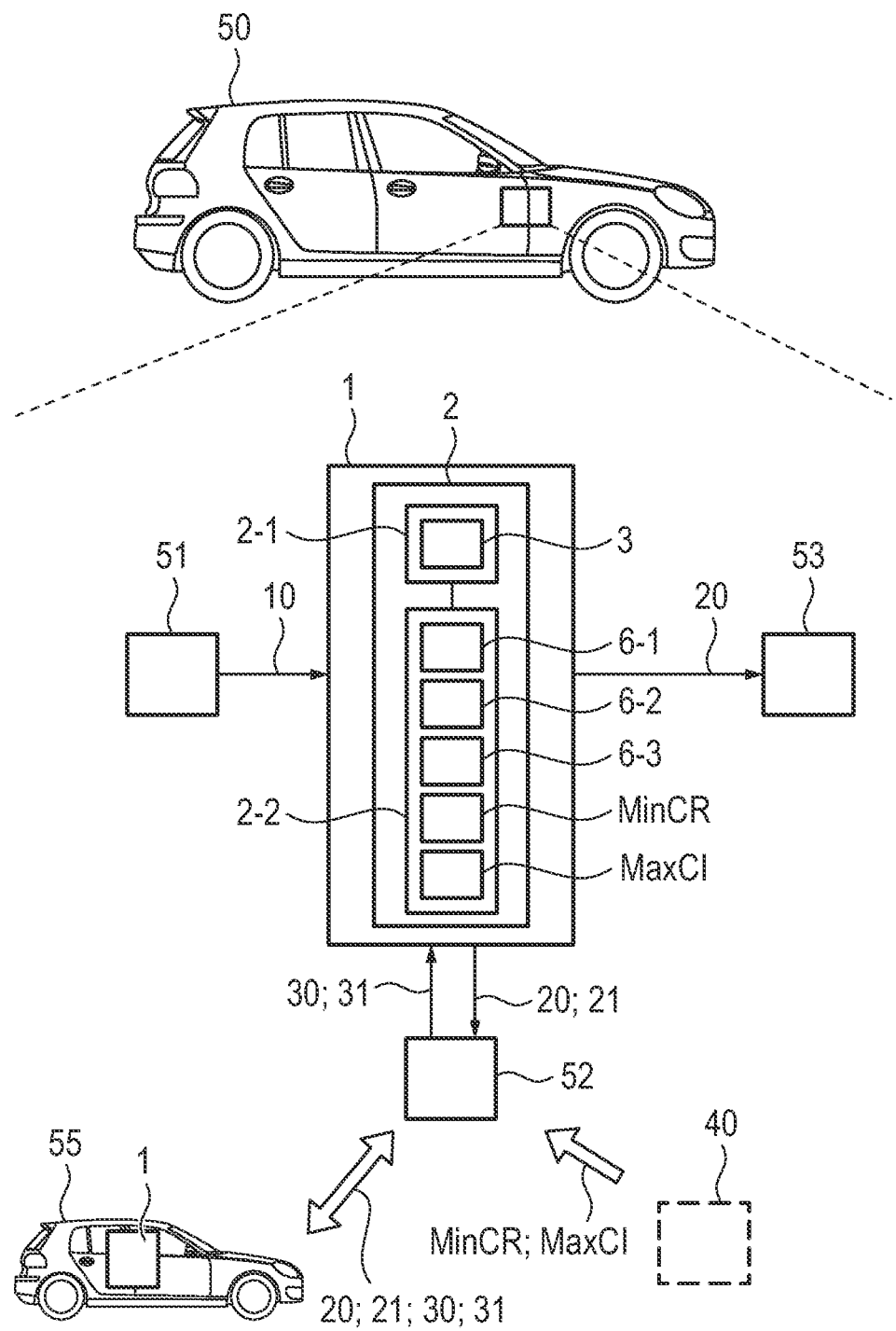
FIG. 1 shows a schematic representation of an embodiment of the assistance system.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, a method for cooperative maneuver planning for at least two vehicles is provided, wherein in each vehicle, a planned trajectory and a desired trajectory are selected depending on a cost function by means of a trajectory planner for each planning cycle from a plurality of drivable trajectories that are generated depending on the environment, and are each transmitted to other vehicles in the environment; wherein for this purpose, a most economical first trajectory is generated which is free of collisions with planned trajectories and desired trajectories of other vehicles, and i) wherein for this purpose, a most economical second trajectory is generated which ignores planned trajectories and desired trajectories of other vehicles, wherein the second trajectory is transmitted as a desired trajectory to other vehicles only if a cost difference between the first trajectory and the second trajectory of the respective vehicle is greater than a predetermined minimum cost reduction value, and ii) wherein for this purpose, in addition or alternative to i), a most economical third trajectory is generated which is collision-free with planned trajectories of other vehicles but ignores desired trajectories of other vehicles, wherein a desired trajectory of another vehicle is accepted by a vehicle during trajectory planning when a cost difference between the first trajectory and the third trajectory is less than a predetermined maximum cost increase value, wherein when there is an accepted desired trajectory of another vehicle, the vehicle uses the first trajectory as the new planned trajectory, and wherein when there is a rejected desired trajectory of the other vehicle, the vehicle uses the third trajectory as the new planned trajectory.

In some embodiments, an assistance system for a vehicle is created, comprising a data processor (also referred to as a 'data processing circuit' herein), wherein the data processor is configured to select within the vehicle a planned trajectory and a desired trajectory depending on a cost function by means of a trajectory planner for each planning cycle from a plurality of drivable trajectories generated depending on the environment, and in each case to transmit them to other vehicles in the environment; and for this purpose, to generate a most economical first trajectory which is free of collisions with planned trajectories and desired trajectories of other vehicles, and i) for this purpose, to generate a most economical second trajectory which ignores planned trajectories and desired trajectories of other vehicles, and to transmit the second trajectory as a desired trajectory to other vehicles only if a cost difference between the first trajectory and the second trajectory of the respective vehicle is greater than a predetermined minimum cost reduction value, and ii) for this purpose, in addition or alternative to i), to generate a most economical third trajectory which is collision-free with planned trajectories of other vehicles but ignores desired trajectories of other vehicles, and to accept a desired trajectory of another vehicle during trajectory planning, when a cost difference between the first trajectory and the third trajectory is less than a predetermined maximum cost increase value, and when there is an accepted desired trajectory of another vehicle, to use the first trajectory as the new planned trajectory, and when there is a rejected desired trajectory of another vehicle, to use the third trajectory as the new planned trajectory.

The method and the assistance system make it possible to reduce a volume of data that must be transmitted for maneuver coordination. Furthermore, the method and the assistance system enable indirect maneuver coordination in which a desired trajectory is accepted or rejected not directly, but rather indirectly, that is, by the individual behavior of the vehicle. On the one hand, this also reduces a volume of data since no other messages need to be transmitted for an acceptance or rejection. On the other hand, this can make an overall coordination or an overall system consisting of several vehicles more stable with respect to maneuver planning.

This is achieved on the one hand by checking a potential desired trajectory (identified as a second trajectory) for the presence of a condition before being transmitted to other vehicles: A cost reduction in realizing such a desired trajectory (i.e., the second trajectory) compared with realizing a provisional planned trajectory (identified as the first trajectory) must be greater than a predetermined minimum cost reduction value. Only when this condition is satisfied is the second trajectory transmitted to other vehicles as the desired trajectory. Otherwise, a desired trajectory is not transmitted, but only the planned trajectory.

Alternatively or in addition to this, a desired trajectory received from another vehicle is checked for the presence of another condition: A cost increase from considering this desired trajectory in trajectory planning must be less than a predetermined maximum cost increase value. For this purpose, a third trajectory is generated which is collision-free with planned trajectories of other vehicles but ignores the desired trajectories of other vehicles. A cost difference between the cost of realizing the first trajectory (which takes into account the incoming desired trajectory from the other vehicle) and the cost of realizing the third trajectory is then determined and compared with the predetermined maximum cost increase value. Depending on a result of the comparison, either the first trajectory or the third trajectory is used as the new planned trajectory, that is in particular as a planned trajectory in the next planning cycle.

The respective planned trajectories and desired trajectories are transmitted to the other vehicles in particular in the form of maneuver coordination messages (MCM). Transmission is in particular carried out by means of a car-to-X communication interface, or another suitable communication interface of the particular vehicle.

Parts of the assistance system, in particular the data processor, may be designed separately or collectively as a combination of hardware and software, for example as program code which is executed on a microcontroller or microprocessor. However, it is also possible for the parts to be designed individually or collectively as an application-specific integrated circuit (ASIC) and/or field-programmable gate array (FPGA).

In some embodiments, it is provided that the second trajectory and/or the third trajectory are only saved for a planning cycle when they differ from the first trajectory. This allows required memory to be reduced. This can be the case in particular in a traffic situation in which there are not any other vehicles in the environment.

In some embodiments, it is provided that the minimum cost reduction value and/or the maximum cost increase value are specified taking into account the current situation. This allows cooperative behavior to be adapted to each current situation. A current situation can for example be a traffic situation, and/or a traffic scenario (entering a highway, turning, changing lane, etc.), and/or weather, and/or traffic density. Accordingly for example, it can be provided to reduce readiness for cooperation in lanes with a large traffic density since for example braking a vehicle in a lane with many following vehicles driving close behind each other in order to let in a vehicle from another lane can lead to a major loss in energy efficiency since the following vehicles would also have to brake. In this example, the maximum cost increase value is then decreased. A traffic situation and/or traffic scenario could for example also relate to a road type (main road, side road, country road, highway, etc.).

In some embodiments, it is provided that the minimum cost reduction value and the maximum cost increase value are specified depending on each other. For example, it can be provided that the maximum cost increase value of a cooperating vehicle is specified taking into account the minimum cost reduction value of a querying vehicle. This can ensure that the overall costs of the vehicles involved in cooperation are reduced so that overall cooperation efficiency can be increased. Furthermore, it can be provided that when one of the values is changed, the other values correspondingly change. This allows the readiness for cooperation to be likewise increased for a vehicle that, for example, is to frequently transmit desired trajectories to other vehicles.

In some embodiments, it is provided that the minimum cost reduction value and/or the maximum cost increase value are provided by at least one infrastructure system (also referred to as 'infrastructure circuit'). This allows cooperation between the vehicles to be influenced and specified depending on the location. Such an infrastructure system can for example be a radio beacon, or a light signal system, or a correspondingly equipped traffic sign, etc. The minimum cost reduction value and/or the maximum cost increase value are then in particular transmitted to the vehicles by radio signal, which they take into account when carrying out the described measures.

In some embodiments, it is provided that the minimum cost reduction value and/or the maximum cost increase value are specified taking into account a driver preference. This allows the driver of a vehicle to individually specify its readiness for cooperation, or to at least influence it. The minimum cost reduction value and/or the maximum cost increase value are for example queried on a display and control device of the vehicle, and/or can be specified with them.

In some embodiments, it is provided that the minimum cost reduction value and/or the maximum cost increase value are specified taking into account vehicle features and/or a vehicle type. This allows vehicle-related restrictions and/or capabilities to be taken into account. A vehicle feature can for example include an ability to recuperate braking energy. Correspondingly, readiness for cooperation can be greater given an ability for recuperation. A vehicle type can for example be an electric vehicle or an internal combustion vehicle. Furthermore, a vehicle type can also relate to a distinction between a civilian vehicle and public vehicle (public transport, emergency vehicles of the police and fire department, etc.). For example, cooperation of civilian vehicles with other vehicles can be greater than cooperation between in-service public vehicles and other vehicles. The minimum cost reduction value and/or the maximum cost increase value are then correspondingly selected.

Some embodiments provide that the cost difference between the first trajectory and the second trajectory is also transmitted to each of the other vehicles when the second trajectory is transmitted as the desired trajectory, wherein the transmitted cost difference from the other vehicles is taken into account in the respective trajectory planning. Despite the benefits of the method for reduced data transmission, this allows group-related maneuver planning in which overall costs can be taken into account and minimized.

Additional features of the design of the assistance system are apparent from the description of embodiments of the method. The benefits of the assistance system in this context may be the same as for the embodiments of the method.

Reference will now be made to the drawings in which the various elements of embodiments will be given numerical designations and in which further embodiments will be discussed.

FIG. 1 shows a schematic representation of an embodiment of the assistance system 1. The assistance system 1 comprises a data processor (processing circuit) 2. The data processor 2 comprises a computer 2-1 and a memory 2-2. The assistance system 1 is arranged in a vehicle 50, in particular in a motor vehicle. The assistant device 1 performs in particular the method described in this disclosure. The method described in this disclosure is explained in more detail in the following with reference to the assistance system 1.

The assistance system 1 is fed environment data 10 from at least one environment sensor 51 of the vehicle 50. The assistance system 1 is configured to perform trajectory planning for the vehicle 50. The data processor 2 is therefore configured to select, depending on a cost function, a planned trajectory 20 and a desired trajectory 21 in the vehicle 50 by means of a trajectory planner 3 for each planning cycle from a plurality of drivable trajectories that are generated depending on the environment, i.e., that are in particular generated taking into account the detected environment data 10, and to transmit each of them to other vehicles 55 in the environment. Transmission occurs for example by means of a car-to-X interface 52 of the vehicle 50. The trajectory planner 3 is in particular provided in the form of program code which is run in the computer 2. Planned trajectories 20 can then be transmitted in particular to a vehicle control system 53 of the vehicle 50, and can then be implemented by the vehicle control system 53 by controlling longitudinal and transverse guidance of the vehicle 50.

To generate the planned trajectory 20 and the desired trajectory 21, the data processor 2 initially generates a most economical first trajectory 6-1 using planned trajectories 30 and desired trajectories 31 of other vehicles.

Furthermore, the data processor 2 is configured in this regard to generate a most economical second trajectory 6-2 which ignores planned trajectories 30 and desired trajectories 31 of other vehicles 55, and to transmit the second trajectory 6-2 as a desired trajectory 21 to other vehicles 55 only if a cost difference between costs of a realization of the first trajectory 6-1 and costs of a realization of the second trajectory 6-2 of the vehicle 50 is greater than a predetermined minimum cost reduction value MinCR.

If $C_{6-1}$ is the costs of a realization of the first trajectory 6-1 and $C_{6-2}$ is the costs of a realization of the second trajectory 6-2, the data processor 2 checks in particular whether $$(C_{6-1} - C_{6-2}) > \text{MinCR}$$

has been satisfied.

The data processor 2 is furthermore configured in this regard to additionally or alternatively generate a most economical third trajectory 6-3 that is collision-free with the planned trajectories 30 of other vehicles 55, but ignores desired trajectories 31 of other vehicles 55. The data processor 2 is configured to accept a desired trajectory 31 of another vehicle 55 in trajectory planning if a cost difference between the first trajectory 6-1 and the third trajectory 6-3 is less than a predetermined maximum cost increase value MaxCI. Given an accepted desired trajectory 31 of another vehicle 55, the first trajectory 6-1 is used as the new planned trajectory 20. Given a rejected desired trajectory 31 of another vehicle 55, the third trajectory 6-3 is in contrast used as the new planned trajectory 20.

If $C_{6-1}$ is the costs of the first trajectory 6-1 and $C_{6-2}$ are the costs of the second trajectory 6-2, the data processor 2 checks in particular whether $$(C_{6-1} - C_{6-3}) < \text{MaxCI}$$

has been satisfied.

It can be provided that the second trajectory 6-2 and/or the third trajectory 6-3 are only saved for a planning cycle when they differ from the first trajectory 6-1.

It can be provided that the minimum cost reduction value MinCR and/or the maximum cost increase value MaxCI are specified taking into account the current situation. To accomplish this, the detected environment data 10 are for example evaluated by means of the data processor 2. Depending on an evaluation result, the minimum cost reduction value MinCR and/or the maximum cost increase value MaxCI are then specified and/or selected from a predetermined list. Examples of situations are different traffic densities and/or different traffic scenarios (urban, rural, highway, intersection, highway on-ramp, etc.).

It can be provided that the minimum cost reduction value MinCR and the maximum cost increase value MaxCR are specified depending on each other.

It can be provided that the minimum cost reduction value MinCR and/or the maximum cost increase value MaxCR are provided by at least one infrastructure system 40. The infrastructure system 40 transmits the values MinCR, MaxCR in particular via the car-to-X interface 52 to the vehicle 50 or the vehicles 50, 55. In so doing, transmission can be locally limited so that different values can be provided for different locations or regions.

It can be provided in some embodiments that the minimum cost reduction value MinCR and/or the maximum cost increase value MaxCR are specified taking into account a driver preference.

It can be provided that the minimum cost reduction value MinCR and/or the maximum cost increase value MaxCR are specified taking into account vehicle features and/or a vehicle type.

It can be provided that the cost difference between the first trajectory 6-1 and the second trajectory 6-2 is also transmitted to each of the other vehicles 55 when the second trajectory 6-2 is transmitted as the desired trajectory 21, wherein the transmitted cost difference is taken into account by the other vehicles 55 in the respective trajectory planning.

Figure 2A:
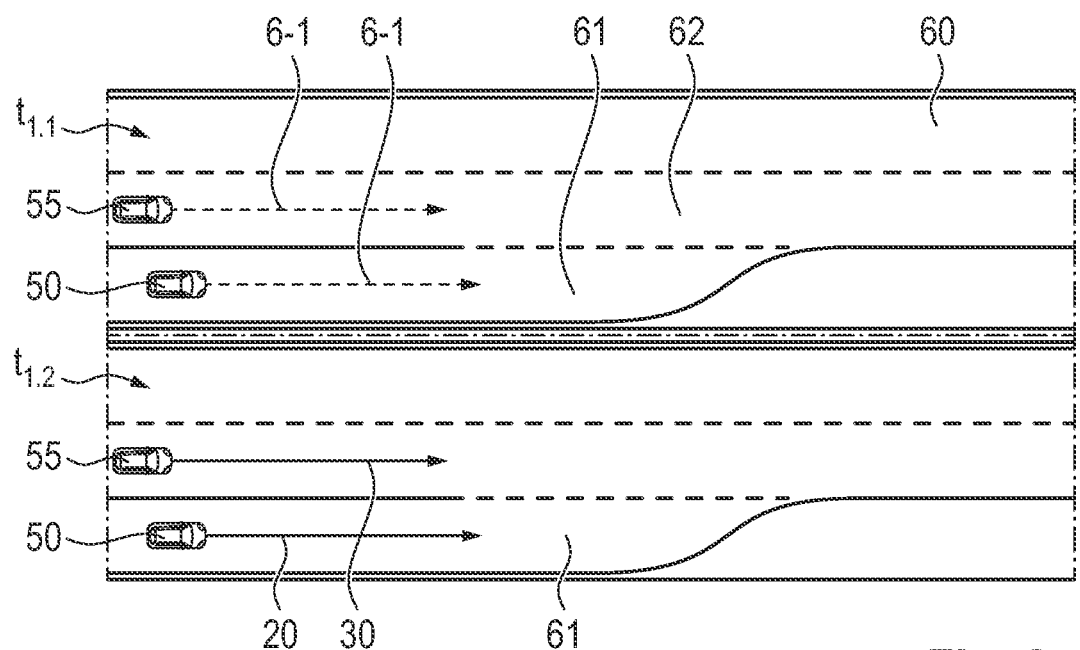
FIGS. 2a and 2b show schematic representations of a traffic situation in sequential planning cycles to illustrate an embodiment of a method.
Figure 2B:
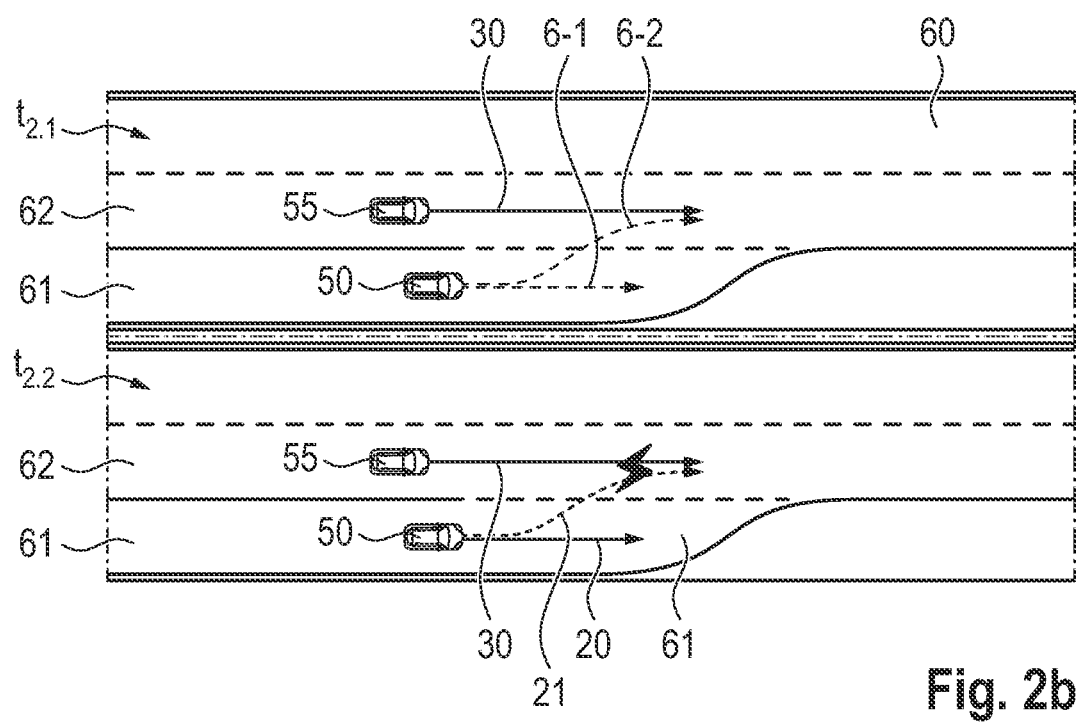

FIGS. 2a and 2b show schematic representations of a traffic situation in sequential planning cycles $t_1$, $t_2$ to illustrate an embodiment of the method. The embodiment corresponds in this case to alternative i). A merging process on a highway 60 is shown. FIG. 2a shows in this case the view of the trajectory planners of both vehicles 50, 55. FIG. 2b shows the view of the trajectory planner of vehicle 50.

The vehicle 50 must merge with a traffic flow from a highway on-ramp 61 of the highway 60 to a right lane 62 of the highway 60. In this case, another vehicle 55 is in the right lane 62.

In a non-cooperative situation, i.e., when a desired trajectory 20, 30 (FIG. 1) or a planned trajectory 21, 31 does not collide with a planned trajectory 20, 30 or desired trajectory 21, 31 of the respective other vehicle 50, 55, only the first trajectory 6-1 is saved by a respective trajectory planner of the vehicles 50, 55, since the other possible second trajectories 6-2 do not differ from the first trajectory 6-1 (shown in $t_{1.1}$). At time $t_1$, a solid line prevents the merging vehicle 50 from calculating a trajectory entering the highway 60. Accordingly, for both the vehicle 50 as well as the other vehicle 55 which is located on the highway 60, only the first trajectories 6-1 exist at time $t_1$, so that they are used as planned trajectories 20, 30 in the planning cycle $t_1$ (shown in $t_{1.2}$).

In a later planning cycle t2 (shown in FIG. 2b), the vehicle 50 is at a position where merging is allowed according to the road traffic regulations. Nonetheless in this situation, the vehicle 50 chooses braking on the highway on-ramp 61 as the most economical first trajectory 6-1 since all other drivable trajectories collide with the planned trajectory 30 of the other vehicle 55 (see FIG. 2b at $t_{2.1}$). In addition, the vehicle 50 generates and saves a second trajectory 6-2 which does not have to be collision-free with the planned trajectory 30 of the other vehicle 55 (and possibly other vehicles). In the portrayed example, this represents a merging operation into the right lane 62 since merging at this time is evaluated as being more economical than braking on the highway on-ramp 61 according to the cost function saved in the trajectory planner. In order for this second trajectory 6-2 to be able to be executed in the near future, successful cooperation is, however, needed with all those road users whose planned trajectories 30 conflict with this second trajectory 6-2, in the present case the planned trajectory 30 of the other vehicle 55. For this purpose, the second trajectory 6-2 can be transmitted in the form of a desired trajectory 21 as an MCM message to other road users, in the example to the other vehicle 55. To prevent too frequent transmission of cooperation requests and therefore inefficient cooperation behavior, the second trajectory 6-2 is evaluated at this point based on the minimum cost reduction value MinCR which specifies a minimum level of cost reduction that must be satisfied before the second trajectory 6-2 is transmitted as a desired trajectory 21 of the vehicle 50.

In the shown example, it is assumed that the costs of the second trajectory 6-2 are less than the costs of the first trajectory 6-1 by at least the amount of the minimum cost reduction value MinCR, i.e., a cost difference is greater than the minimum cost reduction value MinCR so that the vehicle 50 transmits the second trajectory 6-2 as a desired trajectory 21 by means of an MCM message in this planning cycle $t_2$ (shown in $t_{2.2}$). The vehicle 50 uses the collision-free first trajectory 6-1 in this planning cycle $t_2$ as the planned trajectory 20. This continuous iterative evaluation of trajectories 6-1, 6-2 that are possible planned trajectories 20 allows the trajectory planner to react at any time to changing conditions.

If a cost difference between the costs of the first trajectory 6-1 and the costs of the second trajectory 6-2 are contrastingly less than the minimum cost reduction value MinCR, the second trajectory 6-2 is therefore not transmitted as the desired trajectory 21 to the other vehicle 55. This makes it possible to prevent unnecessary data transmission.

Figure 3A:
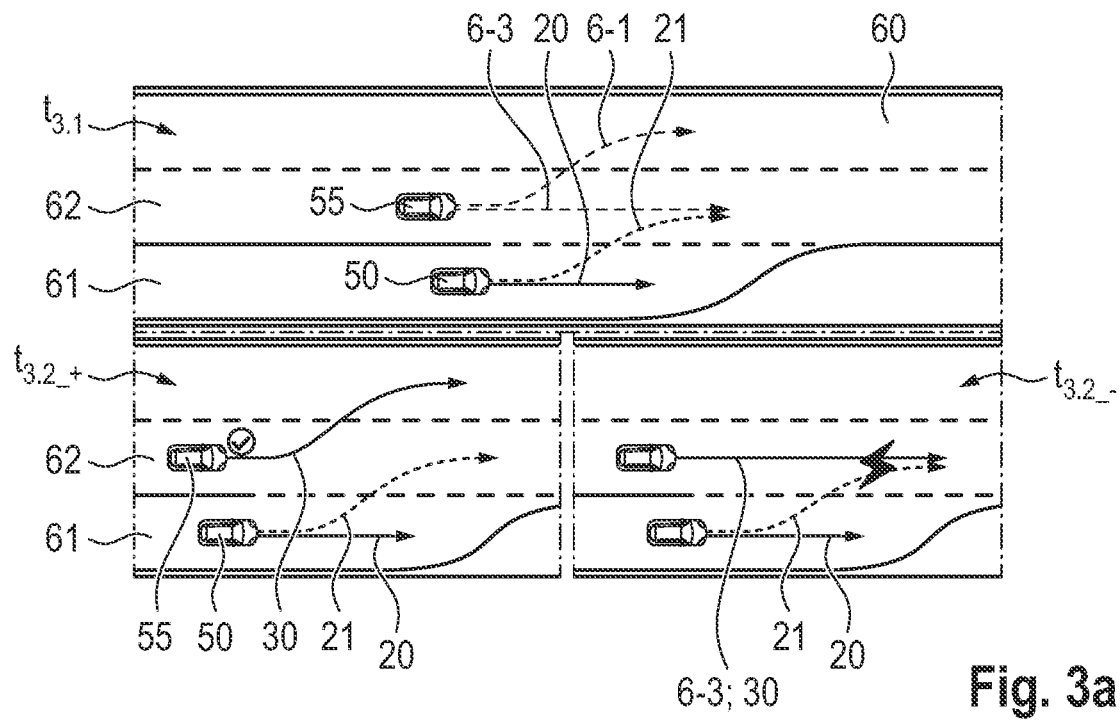
FIGS. 3a, 3b, and 3c show schematic representations of the same traffic situation in subsequent planning cycles to illustrate an embodiment of the method.
Figure 3B:
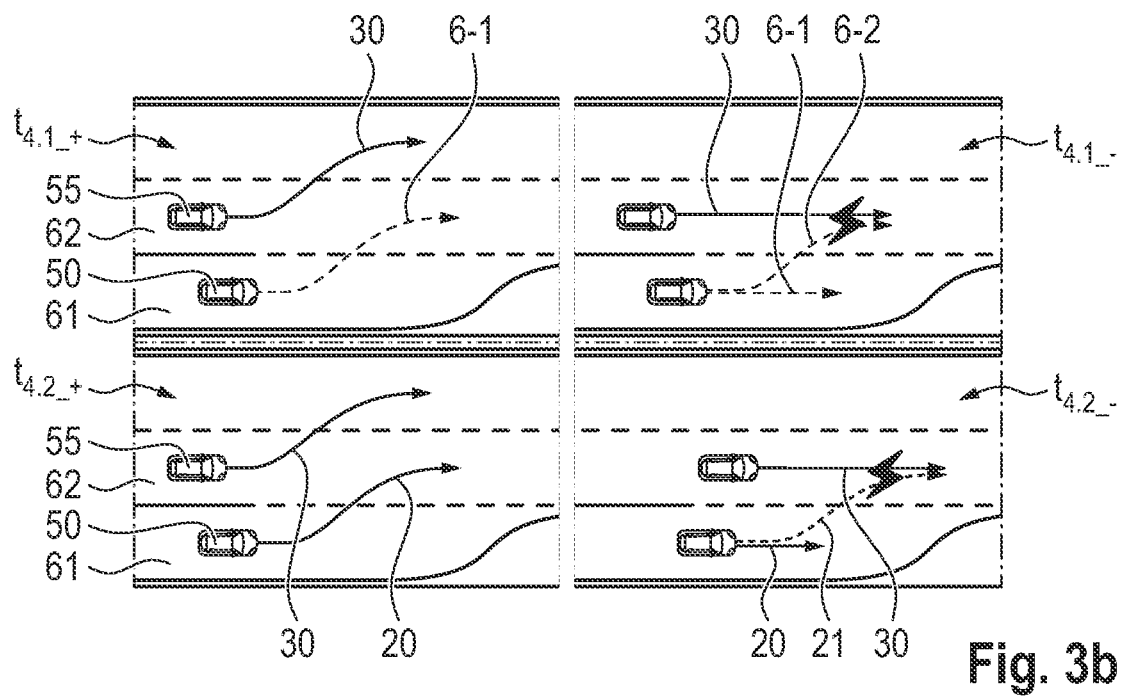
Figure 3C:
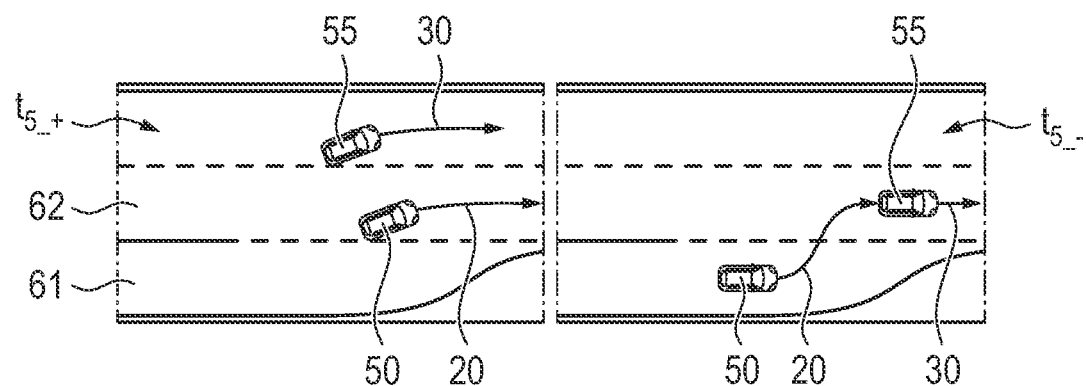

FIGS. 3a to 3c show schematic representations of the same traffic situation in subsequent planning cycles to illustrate an embodiment of the method. The described embodiment corresponds in this case to the additional or alternative embodiment ii). The merging process on the highway 60 is also shown. FIG. 3a shows a view of the trajectory planner of the other vehicle 55. FIG. 3b shows a view of the trajectory planner of the vehicle 50. FIG. 3c shows a view of the trajectory planners of both vehicles 50, 55.

The situation is the same as that shown in FIGS. 2a and 2b, but at later planning times $t_3$, $t_4$, $t_5$.

In this case as described above, the vehicle 50 on the highway on-ramp 61 sends a desired trajectory 21 as an MCM message to the other vehicle 55 in order to be able to enter the right lane 61 of the highway 60 without having to brake enough to only enter the right lane 61 behind the other vehicle 55. Parallel to this, the planned trajectory 20 is also always transmitted for each planning cycle $t_x$ in such an MCM message, in particular in the same MCM message.

Once the trajectory planner of the other vehicle 55 receives the desired trajectory 21 of the (cooperative) vehicle 50 in the form of an MCM message, the trajectory planner must weigh whether the desired trajectory 21 should be accepted and integrated into its own trajectory planning. This is illustrated by way of example in FIG. 3a. Since the first trajectory 6-1 of the other vehicle 55 must be collision-free with the desired trajectory 21 of the vehicle 50, this includes a lane change to a left lane 63 of the highway 60. In this case, a more economical (for the other vehicle 55) third trajectory 6-3 results which ignores collisions with the desired trajectory 21 of the vehicle 50 (and possibly present other vehicles) and therefore does not make a lane change. In such a situation, the question arises for the trajectory planner of the other vehicle 55 of a still acceptable cost increase up to which the received desired trajectory 21 of the vehicle 50 can be accepted and taken into account. For this purpose, the first trajectory 6-1 of the other vehicle 55 is compared with the third trajectory 6-3 of the other vehicle 55. To prevent too frequent acceptance of cooperation requests in the form of received desired trajectories 21 and cooperative behavior that is considered inefficient in the overall system, a cost difference between the first trajectory 6-1 of the other vehicle 55 and the third trajectory 6-3 of the other vehicle 55 must be less than a predetermined maximum cost rise value MaxCI. FIG. 3a shows two possible results of the comparison (shown in $t_{3.2}$). If there is a positive decision ($t_{3.2}$_+), i.e. when the cost difference is less than the specified maximum cost increase value MaxCI, the other vehicle 55 uses the first trajectory 6-1 as the new planned trajectory 30. If the cost difference exceeds the value of MaxCI, the other vehicle 50 contrastingly uses the third trajectory 6-3 as the new planned trajectory 30 so that the desired trajectory 21 of the vehicle 50 is still in conflict with the (new) planned trajectory 30 of the other vehicle 55.

FIG. 3b shows the view of the trajectory planner of vehicle 50 in a subsequent planning cycle. Given an accepted cooperation in $t_3$ (FIG. 3a), the planned trajectory 30 of the other vehicle 55 no longer poses a conflict with the desired trajectory 21 of vehicle 50, i.e., with the requested lane change, so that the first trajectory 6-1 (generated for this planning cycle) of the vehicle 50 includes a merging operation to the right lane 62 ($t_{4.1}$_+). The first trajectory 6-1 can therefore be used by the vehicle 50 as the new planned trajectory 20 ($t_{4.2}$_+).

Given a rejection of the cooperation in the planning cycle $t_3$ (FIG. 3a), the first trajectory 6-1 (generated for this planning cycle) of the vehicle 50 contrastingly also represents a braking on the highway on-ramp 61 in the planning cycle $t_4$ ($t_{4.1}$_-). Analogous to time$_3$, a more economical second trajectory 6-2 would in particular also be saved which ignores the collision with the planned trajectory 30 of the other vehicle 55. If, in this planning cycle $t_4$ as well, the costs of the second trajectory 6-2 of the vehicle 50 are less than the costs of the first trajectory 6-1 of the vehicle 50 by at least the predetermined minimum cost reduction value MinCR, the vehicle 50 again transmits a desired trajectory 21 as the MCM message. The first trajectory 6-1 is used as the planned trajectory 20 so that the vehicle 50 would brake on the highway on-ramp 61 ($t_{4.2}$_-). In a subsequent planning cycle, the other vehicle 55 would again take into account the incoming desired trajectory 21 of the vehicle 50 when selecting the planned trajectory 30 according to the procedure described above.

Finally, FIG. 3c shows a possible outcome of a merging process in the case of cooperation ($t_5$_+) or continued rejection ($t_5$_-) of the cooperation requests by the other vehicle 55 from the perspective of both trajectory planners. In the case of cooperation ($t_5$_+), the other vehicle 55 moves to the left lane 63, thereby freeing up the right lane 62, and the vehicle 50 can change from the highway on-ramp 61 to the right lane 62. In the case of continued refusal ($t_5$_-), the vehicle 50 must brake on the highway on-ramp 61 and can change to the right lane 62 only behind the other vehicle 55.

Figure 4:
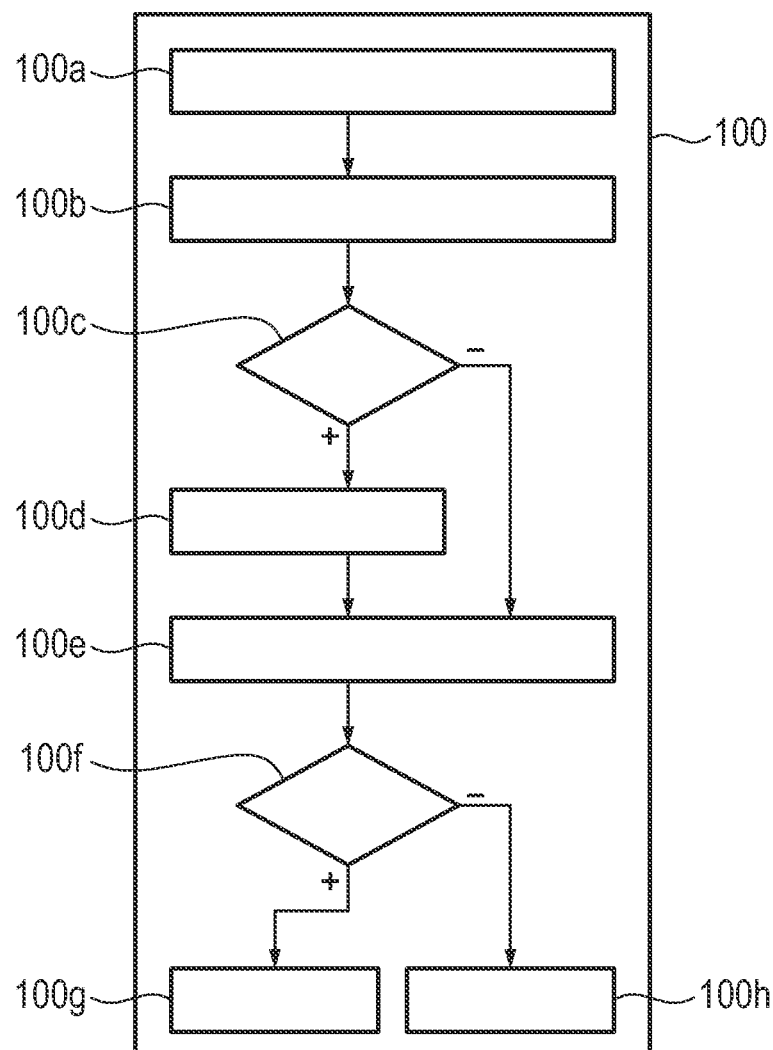
FIG. 4 shows a schematic flowchart of an embodiment of the method for cooperative maneuver planning for at least two vehicles.

FIG. 4 shows a schematic flow chart of an embodiment of the method for cooperative maneuver planning for at least two vehicles.

In one measure 100, depending on a cost function, a planned trajectory and a desired trajectory are selected in each vehicle by means of a trajectory planner for each planning cycle from a plurality of drivable trajectories that are generated depending on the environment, and are each transmitted to other vehicles in the environment.

In one measure 100a, a most economical collision-free first trajectory is generated for this purpose with planned trajectories and desired trajectories of other vehicles.

In one measure 100b, a most economical second trajectory is generated that ignores planned trajectories and desired trajectories of other vehicles.

In one measure 100c, it is checked whether a cost difference between the first trajectory and the second trajectory of the respective vehicle is greater than a predetermined minimum cost reduction value. If this is the case, the second trajectory is transmitted to other vehicles in a measure 100d as the respective desired trajectory. Otherwise, no desired trajectory is transmitted to other vehicles, and measure 100e is continued.

In the measure 100e, a most economical third trajectory is generated which is collision-free with planned trajectories of other vehicles but ignores the desired trajectories of other vehicles.

In one measure 100f, it is checked whether a cost difference between the first trajectory and the third trajectory is less than a predetermined maximum cost increase value. If this is the case, (i.e., the desired trajectory of the other vehicle is accepted), the first trajectory is used in a measure 100g as the new planned trajectory. If this is contrastingly not the case (rejected desired trajectory), the third trajectory is used as the new planned trajectory in a measure 100h.

The measures 100e to 100h can be performed alternatively or in addition to measures 100a to 100d. In particular, it is provided that measures 100a to 100d and measures 100e to 100h are carried out in parallel to each other.

Further embodiments of the method have already been described above.

A benefit of the method and the assistance system is that a volume of data can be reduced. Furthermore, cooperation between vehicles can be indirect, in that each vehicle itself transmits a planned trajectory and at most one desired trajectory to other vehicles in the environment. There is no direct confirmation that a desired trajectory of another vehicle is taken into account in trajectory planning. However, there is an indirect confirmation in that the planned trajectory (which is then transmitted to other vehicles) is correspondingly changed. Stable cooperative maneuver planning of at least two vehicles can thereby be achieved.

LIST OF REFERENCE NUMERALS

1 Assistance system
2 Data processor
2-1 Computer
2-2 Memory
3 Trajectory planner
6-1 First trajectory
6-2 Second trajectory
6-3 Third trajectory
10 Sensor data
20 Planned trajectory (vehicle)
21 Desired trajectory (vehicle)
30 Planned trajectory (other vehicle)
31 Desired trajectory (other vehicle)
40 Infrastructure system
50 Vehicle
51 Environment sensor
52 Car-to-X interface
53 Vehicle controller
60 Highway
61 Highway on-ramp
62 Right lane
63 Left lane
100, 100a-h Measures of the method
$t_x$ Planning cycle The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The terms "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:
1. A method for cooperative maneuver planning for at least two vehicles, comprising:
   selecting, in each vehicle, a planned trajectory and a desired trajectory depending on a cost function using a trajectory planner for each planning cycle from a plurality of drivable trajectories generated depending on the environment;

transmitting the planned trajectory and the desired trajectory to other vehicles in the environment;

generating a most economical first trajectory which is free of collisions with planned trajectories and desired trajectories of other vehicles;

generating a most economical second trajectory which ignores planned trajectories and desired trajectories of other vehicles, wherein the second trajectory is transmitted as a desired trajectory to other vehicles only if a cost difference between the first trajectory and the second trajectory of the respective vehicle is greater than a predetermined minimum cost reduction value;

generating in addition or alternative to the second trajectory, a most economical third trajectory which is collision-free with planned trajectories of other vehicles but ignores desired trajectories of other vehicles, wherein a desired trajectory of another vehicle is accepted by a vehicle during trajectory planning when a cost difference between the first trajectory and the third trajectory is less than a predetermined maximum cost increase value;

in case there is an accepted desired trajectory of another vehicle, using, by the vehicle, the first trajectory as the new planned trajectory; and in case there is a rejected desired trajectory of the other vehicle, using, by the vehicle, the third trajectory as the new planned trajectory.

2. The method of claim 1, wherein the second trajectory and/or the third trajectory are only saved for a planning cycle when they differ from the first trajectory.

3. The method of claim 2, wherein the minimum cost reduction value and/or the maximum cost increase value are specified taking into account the current situation.

4. The method of claim 2, wherein the minimum cost reduction value and the maximum cost increase value are specified depending on each other.

5. The method of claim 2, wherein the minimum cost reduction value and/or the maximum cost increase value are provided by at least one infrastructure system.

6. The method of claim 2, wherein the minimum cost reduction value and/or the maximum cost increase value are specified taking into account a driver preference.

7. The method of claim 1, wherein the minimum cost reduction value and/or the maximum cost increase value are specified taking into account the current situation.

8. The method of claim 7, wherein the minimum cost reduction value and the maximum cost increase value are specified depending on each other.

9. The method of claim 7, wherein the minimum cost reduction value and/or the maximum cost increase value are provided by at least one infrastructure system.

10. The method of claim 7, wherein the minimum cost reduction value and/or the maximum cost increase value are specified taking into account a driver preference.

11. The method of claim 1, wherein the minimum cost reduction value and the maximum cost increase value are specified depending on each other.

12. The method of claim 11, wherein the minimum cost reduction value and/or the maximum cost increase value are provided by at least one infrastructure system.

13. The method of claim 11, wherein the minimum cost reduction value and/or the maximum cost increase value are specified taking into account a driver preference.

14. The method of claim 1, wherein the minimum cost reduction value and/or the maximum cost increase value are provided by at least one infrastructure system.

15. The method of claim 14, wherein the minimum cost reduction value and/or the maximum cost increase value are specified taking into account a driver preference.

16. The method of claim 1, wherein the minimum cost reduction value and/or the maximum cost increase value are specified taking into account a driver preference.

17. The method of claim 1, wherein the minimum cost reduction value and/or the maximum cost increase value are specified taking into account vehicle features and/or a vehicle type.

18. The method of claim 1, wherein the cost difference between the first trajectory and the second trajectory is also transmitted to each of the other vehicles when the second trajectory is transmitted as the desired trajectory, wherein the transmitted cost difference is taken into account by the other vehicle in the respective trajectory planning.

19. An assistance system for a vehicle, comprising:
a data processor, configured to select, depending on a cost function, a planned trajectory and a desired trajectory in the vehicle using a trajectory planner for each planning cycle from a plurality of drivable trajectories that are generated depending on the environment, and to transmit each of them to other vehicles in the environment; wherein the data processor is further configured:

to generate a most economical first trajectory which is free of collisions with planned trajectories and desired trajectories of other vehicles;

to generate a most economical second trajectory which ignores planned trajectories and desired trajectories of other vehicles, and to transmit the second trajectory as a desired trajectory to other vehicles only if a cost difference between the first trajectory and the second trajectory of the respective vehicle is greater than a predetermined minimum cost reduction value;

in addition or alternative to generating the second trajectory, to generate a most economical third trajectory which is collision-free with planned trajectories of other vehicles but ignores desired trajectories of other vehicles;

to accept a desired trajectory of another vehicle during trajectory planning when a cost difference between the first trajectory and the third trajectory is less than a predetermined maximum cost increase value;

in the case of an accepted desired trajectory of another vehicle, to use the first trajectory as the new planned trajectory; and in the case of a rejected desired trajectory of another vehicle, to use the third trajectory as the new planned trajectory.

20. A vehicle comprising an assistance system of claim 19.

* * * * *